United States Patent [19]
Kubouchi et al.

[11] Patent Number: 5,294,135
[45] Date of Patent: Mar. 15, 1994

[54] METAL GASKET AND PRODUCTION METHOD THEREOF

[75] Inventors: Kenji Kubouchi, Hirakata; Hiroshi Uemura, Higashiosaka; Shigeru Kawaguchi, Daitou; Kunitoshi Inoue, Higashiosaka, all of Japan

[73] Assignee: Nippon Gasket Co., Ltd., Osaka, Japan

[21] Appl. No.: 937,093

[22] Filed: Aug. 31, 1992

[30] Foreign Application Priority Data

Sep. 5, 1991 [JP] Japan .................. 3-252847

[51] Int. Cl.$^5$ .................................... F16J 15/06
[52] U.S. Cl. .................. 277/235 B; 277/236; 277/215; 277/231; 29/888.3
[58] Field of Search ............ 277/235 B, 236, 214, 277/215, 231, 235 A, 235 R; 29/888.3

[56] References Cited

U.S. PATENT DOCUMENTS

| | | | |
|---|---|---|---|
| 3,053,544 | 9/1962 | Gorsica | 277/235 B |
| 4,121,846 | 10/1978 | Skrycki | 277/235 BX |
| 4,213,620 | 7/1980 | Kennedy et al. | 277/235 B |
| 4,836,562 | 6/1989 | Yoshino | 277/235 B |

FOREIGN PATENT DOCUMENTS

| | | | |
|---|---|---|---|
| 0485693 | 5/1992 | European Pat. Off. | 277/235 B |
| 0486255 | 5/1992 | European Pat. Off. | |
| 0232368 | 10/1986 | Japan | 277/235 B |
| 0255253 | 12/1986 | Japan | 277/235 B |
| 0214570 | 9/1988 | Japan | 277/236 |
| 0015372 | 1/1992 | Japan | 277/235 B |
| 0181070 | 6/1992 | Japan | 277/235 B |
| 4-181070 | 6/1992 | Japan | |
| 248071 | 9/1992 | Japan | 277/235 B |

*Primary Examiner*—William A. Cuchlinski, Jr.
*Assistant Examiner*—James K. Folker
*Attorney, Agent, or Firm*—Browdy and Neimark

[57] ABSTRACT

This invention provides a metal gasket and its production method which prevents damage to folded portions by fold-machining and damage to metal materials after fastening, and expands the range of selection of materials for elastic metal plates, by reducing the thickness of a predetermined region of a elastic metal plate at which folded portions are to be formed. The thickness of the folded portion of the elastic metal plate is reduced from the folding side in an inner region of folded base portions and in regions in which folded free ends are positioned. Bend-machining is made gently at the folded base portions subjected to fold-bend machining, and the folded base portions each have a gap there-inside. The folded free ends do not come into contact with the elastic metal plate due to recessed surfaces. Accordingly, cracks and wrinkles do not occur at the folded base portions, and the folded free ends do not leave friction traces on the elastic metal plate.

10 Claims, 3 Drawing Sheets

METAL GASKET AND PRODUCTION METHOD THEREOF

BACKGROUND OF THE INVENTION:

1. Field of the Invention

This invention relates to a metal gasket used for sealing opposed fitting surfaces between a cylinder head and a cylinder block in a multiple-cylinder engine, and its production method.

2. Description of the Prior Art

A metal gasket made of a metal material has been used conventionally to seal opposed fitting surfaces between a cylinder head and a cylinder block of an engine. The metal gasket generally has beads in the proximity of holes for combustion chamber, water holes and oil holes of the structural members described above, and when it is fixed by fastening the cylinder head and the cylinder blocks by bolts, etc., the beads form elastic annular contact portions with respect to the opposed fitting surfaces, and seal them around the above holes.

However, a higher output and a smaller weight have been required for recent engines and as one of means for satisfying the requirements, the cylinder head, the cylinder block, etc., tend to be produced by using an aluminum material having a small specific gravity in place of the conventional materials having a great specific gravity such as a steel and a casting. Though light in weight, the aluminum material has low rigidity. Therefore, troubles are likely to occur at the time of fastening of the metal gasket and during the operation of the engine. In other words, the positions of the fastening bolts of the metal gasket are dispersed to outer peripheral portions or relatively to the outer peripheral portions of the metal gasket and are not always disposed uniformly around the holes. Therefore, when the opposed fitting surfaces of the structural materials having the low rigidity are fastened by the bolts through the metal gasket consisting of a single plate, the opposed fitting surfaces are likely to become non-uniform. As a result, a high temperature high pressure combustion gas enters between the opposed fitting surfaces of portions having large distortion, such as the portions between the holes, corrodes and contaminates the beads of the metal gasket interposed between the opposed fitting surfaces, and lowers the seal effect.

Furthermore, since rigidity of these structural materials lowers, relative displacement of the cylinder head to the cylinder block becomes great in accordance with combustion cycles during the engine operation, the gap between the cylinder head and the cylinder block repeatedly increases and decreases, and the temperature of the metal gasket changes greatly in accordance with the operation and stop of the engine. Accordingly, repeated stresses, that is, mechanical stress and thermal stress, act on the metal gasket, too. This load fluctuation stress is most pronounced at portions having the lowest rigidity of the cylinder block and the cylinder head, so that the beads undergo buckling or cracks develop, thereby deteriorating seal performance.

The Applicant of the present invention previously filed a patent application relating to a single plate metal gasket disposed and fastened between the opposed fitting surfaces of the cylinder head and the cylinder block of the engine, and its production method (Japanese Patent Application No. 306295/1990). This metal gasket includes holes formed in a elastic metal plate, beads spaced apart outward in a radial direction from the periphery of the holes and extending along the holes, and folded portions formed by folding the metal plate on the convexed surface side of the beads around the holes and outward in the radial direction. The folded portions of the metal plate are shaped into a predetermined thickness, and are heat-treated. Therefore, when the elastic metal plate is fastened and brought into a pressed state between the opposed fitting surfaces, the beads form annular seal portions with respect to the opposed fitting surfaces and at the same time, the folded portions which have about twice the thickness of the metal plate form another seal portions around the holes, and the beads and the folded portions offset any irregularity of the opposed fitting surfaces, suppress a distortion quantity of the cylinder head occurring due to the repetition of the combustion cycles, reduces the fluctuation load stress, and prevent complete compression of the beads.

In the metal gasket described above, the reference discloses a structure wherein a metal plate having a thickness smaller than that of the metal plate described above is laminated on the external side of the beads other than the portions between the holes in a radial direction and on the convexity surface side of the beads, and an offset between the folded portions and regions which are more outwards than the beads in the radial direction is regulated, a structure wherein a soft metal plate is clamped in the folded portions and folded back when the offset is below a necessary offset, a structure wherein the folded portions are so formed as to be thick in the regions between the holes and to be thin in other regions so as to obtain a high push force in the regions between the holes at which high seal performance is required, and a structure wherein a non-metallic material such as heat- and oil-resistant rubber or resin is applied to both surfaces of the elastic metal plate in order to avoid the direct metal-to-metal contact with the opposed fitting surfaces, to prevent corrosion and contamination of the metal surface and to secure the seal function irrespective of concavo-convexities of the opposed fitting surfaces.

The production method of the metal gasket described above comprises a step of forming in the elastic metal plate perforations having an inner diameter smaller than that of the holes that would have been finished; a step of forming beads along the periphery of the perforations in such a manner as to be spaced outward in the radial direction from the periphery of the perforations; a step of forming folded portions having folded base portions serving as cylinder bore holes by bending outward the metal sheet in the radial direction on the convexity side of the beads around the perforations; a step of applying a compressive force to the folded portions and shaping them into a predetermined thickness; and heat-treating the metal plate having the folded portions formed thereon.

However, the metal gasket described above forms basically the perforations having an inner diameter smaller than that of the holes and includes the elastic metal plate having the folded portions formed by folding outward the plate in the radial direction around the perforations. Accordingly, such a elastic metal plate has a structure where the folded portions are completely folded 180° without a gap at the folded base end portions serving as the holes, and receive a servere stress change at the time of machining. Therefore, damage such as cracks and breakage is likely to occur at the folded portions, or the metal plate is exposed to the repeated stress in accordance with the combustion cycles for a long time after being fixed between the opposed fitting surfaces, even though it is heat-treated, and cracks are likely to occur at the folded base portions.

When the folded portions are formed around the holes, an offset portion corresponding to the thickness of the plate is formed between the periphery of the hole and in a region which is outward in the radial direction from the periphery. If this offset portion is great, the elastic metal plate of the gasket main body compulsively undergoes deformation in the regions inside and outside this offset portion when the metal gasket is fastened between the opposed fitting surfaces of the cylinder head and the cylinder block. This deformation region is originally disadvantageous stress-wise, and cracks, etc., are likely to occur because more compulsive stress acts on it due to the load fluctuation in accordance with the combustion cycles of the engine. Furthermore, when the elastic metal plate has the beads formed into a profile shape extending along the holes for combustion chamber and located outward from the folded portions in the radial direction, strong seal portions are defined at the time of fastening and prevent the leak of the corrosive, high temperature combustion gas from the holes for combustion chamber if the thickness of the folded portions is great, and the role of sealing of the portions having the beads formed thereon is eased that much. Accordingly, the burden of sealing concentrates excessively on the folded portions, and when the folded portions are broken during the use for a long time, the sealing of the beads which is not much strong cannot exhibit effectively the functions of preventing the leak of the combustion gas When the offset portion of the elastic metal plate by the folded portions described above is higher than a desired height, the height of the offset portion of the folded portions can be regulated to decrease it by laminating a thickness regulation plate on the elastic metal plate, but according to such a regulation method, the regulation plate must be prepared separately. Therefore, the production cost of the metal gasket rises, and when the regulation plate is produced, it must be provided with the shape which coincides with the machining shapes of the beads, etc., of the elastic metal plate. In addition, a lamination on the elastic metal plate becomes necessary, and an apparatus for the lamination becomes also necessary. For these reasons, this method is troublesome and is not economically advantageous.

The free ends of the folded portions are not particularly subjected to chamfering, etc., and come as such into contact with the, surface of the elastic metal plate. Since the elastic metal plate is exposed to the environment in which the stress acts repeatedly for a long time, cracks and traces of friction occur on the surface of the flexible metal plate.

In the production method of the metal gasket, the metal gasket involves the limitations of the thickness, hardness and elongation characteristics of the elastic metal plate used. As to the thickness of the elastic metal plate, the thickness of the folded portions is not adjusted in advance. Therefore, fold-machining must be carried out using the thickness of the elastic metal plate used, and the force required for machining is great, so that a drastic change of the plate thickness occurs at the folded base portions and the folded portions are likely to crack. In the case of so-called "pre-compression" where the plate thickness is adjusted by a press, etc., after the elastic metal plate is folded, the adjustment quantity becomes great. Furthermore, since it is difficult to improve precision of the thickness adjustment and flatness, there is a limit to the thickness of the plate that can be employed.

In connection with the hardness of the elastic metal plate, a material having a high hardness cannot be folded easily. Therefore, a elastic metal plate which is relatively soft with a hardness of below Hv 200 before fold-machining and which can be machined easily but keeps its hardness must be selected and used. In this point, too, there is a limitation to the hardness of the elastic metal plate that can be employed. As to the elongation characteristics of the elastic metal plate, cracks, breakage, distortion, etc., are likely to occur at the folded portions during fold-machining if a material having inferior elongation characteristics is used. Accordingly, an expensive flexible metal plate having good elongation characteristics must be employed in order to prevent the occurrence of cracks, breakage, distortion, and so forth.

SUMMARY OF THE INVENTION

It is therefore an object of the present invention to solve the problems described above, and to provide a metal gasket which prevents cracks, breakage, distortion, etc., at the folded portions of the elastic metal plate described above by forming recesses in regions on the folding inner surface side of the elastic plate and thus reducing plate thickness before the formation of the folded portions, and which prevents the folded free ends from generating friction traces and cracks on the surface of the elastic metal plate without compensating for the excessively great offset portion by separately providing a regulation plate, for example.

This metal gasket is equipped with the elastic metal plate having the folded portions and forming also the holes by the folded base portions of the folded portions, first annular grooves for reducing the thickness of the elastic metal plate are formed in the inner surface side of the folded base portions along the holes, the metal plate is folded in such a manner as to define annular hollow portions on the inner surface sides of the folded base portions by the annular grooves, and second annular grooves for reducing the thickness are formed in that part of the surface of the elastic metal plate at which the folded free ends of the folded portions are positioned. Accordingly, when the metal gasket is interposed and fastened between the opposed fitting surfaces of the engine, the folded portions are not pressed to opposed surfaces at the folded base portions having the gap, and are not pressed to the elastic metal plate main body in the regions of the folded free ends.

In this metal gasket, therefore, it is the annular regions between the folded base portions and the folded free ends in which the folded portions come into contact with the elastic metal plate main body, and such regions share and support the fastening force. The gap described above is not absorbed at the folded base portions under the fastened state of the metal gasket, and is secured even at the time of completion of fastening. Accordingly, the folded base portions are not crushed, and stress concentration does not occur, either. Furthermore, cracks and wrinkles do not occur at the folded base portions with the progress of fastening of the metal gasket. Though the load fluctuation resulting from the engine operation acts on the folded base portions, too, such a stress fluctuation is absorbed and mitigated by the contacting annular regions described above, so that cracks and wrinkles do not occur at the folded base portions even after the use of the metal gasket for a long time.

Since the folded free ends are out of contact from the elastic metal plate main body, the folded free ends do not generate any indentations, friction traces and cracks by their edge on the surface of the elastic metal plate main body at the time of fastening of the metal gasket and during the engine operation. Moreover, though the folded portions serve as the offset portions with respect to the elastic metal plate main body, the surface of the elastic metal plate at which the folded free ends are positioned is recessed by the reduction of thickness. Accordingly, the thin portions do not interfere with the folded free ends at the time of fastening of the elastic metal plate between the opposed fitting surfaces, but the folded portions can be bent from a position inward in the radial direction from the folded free ends, so that the bending stress occurring in the elastic metal plate main body at the offset portions can be eased.

In this metal gasket, another elastic metal plate is laminated on the elastic metal plate described above, the beads are formed on this another elastic plate along the holes for combustion chamber, and the convexity of the beads and the folded portions of the elastic metal plate are disposed on the opposed sides.

Furthermore, in this metal gasket, the beads are formed on the elastic metal plate along the holes in such a manner that the folded portion side describes the convexity, and the folded portions can share and support the fastening force, prevent complete compression and buckling of the beads, offset particularly the irregularity of the cylinder head, suppress its distortion, and lighten the fluctuation load during the engine operation.

In the metal gasket described above, another elastic metal plate is laminated on the elastic metal plate described above, the beads are formed on this another elastic metal plate along the holes, and the convexities of the beads fit into the concavities of the beads of the elastic metal plate in a matching state.

It is another object of the present invention to provide a production method of a metal gasket, which eases the limitations imposed on materials such as the thickness, hardness and elongation characteristics of a elastic metal plate, and can economically produce a quality metal gasket without causing cracks, breakage, distortion, etc., at folded portions in a folding step.

This production method of a metal gasket includes a step of forming perforations having a inner diameter smaller than that of holes in a elastic metal plate; a step of machining annular grooves for reducing the thickness of a folding region, which becomes the inner surface side of folded base portions and that of a region in which folded free ends of the folded free ends are positioned, on the folded side of the elastic metal plate; and a step of heat-treating the metal plate having the folded portions formed thereon. Therefore, when the periphery of the perforations formed in the elastic metal plate is folded, the thickness of a to-be-folded region, which will exist on the inside of the folded base portions of the folded portions on the folded side of the elastic metal plate, is in advance reduced. Therefore, the force necessary for folding can be small. Furthermore, when folding is carried out, the elastic metal plate is not folded 180° sharply and completely, but is folded during the machining process in which the metal material undergoes gradual deformation. Accordingly, damage to the metal material is less when forming the folded base portions, and residual concentrated stress can be decreased, as well. The predetermined region in which the folded free ends of the folded portions are positioned is also shaped to a small thickness beforehand and for this reason, the folded free ends do not strongly press the surface of the elastic metal plate main body and do not either leave indentations on the surface when fold-machining is carried out.

The production method of the metal gasket includes further a step of forming beads having a convexity on the folded side along the holes in the elastic metal plate.

The production method of the metal gasket includes further a step of laminating another elastic metal plate equipped with beads along the holes for combustion chamber of the elastic metal plate.

As already explained, the metal gasket proposed in the afore-mentioned previous patent application involves the limitation of the thickness, hardness and elongation characteristics of the elastic metal plate used. The production method of a metal gasket according to the present invention can ease such limitations. In other words, as to the thickness of the elastic metal plate, the thickness of the folded base portions, which is the portions to be directly subjected to fold-machining, of the folded portions is reduced to such an extent that it can be easily machined. Accordingly, the force necessary for machining may be small, and since a folding angle at the folded base portions is relatively obtuse and the folded portions do not involve a drastic deformation of the material, cracks, etc., do not occur. According to so-called "pre-compression" which adjusts the thickness by a press, etc., adjustment precision of the thickness and flatness can be obtained relatively easily even when the adjustment quantity is great. Therefore, the limitation to the thickness of the plate, that can be employed, can be eased.

As to hardness of the elastic metal plate, fold-machining can be carried out through relatively gentle material deformation. Accordingly, fold-machining is possible even for a material having a relatively high hardness so long as its hardness is below Hv 350 before fold-machining. In this point, too, the limitation to the hardness of the usable elastic metal plate is eased, and the selection range of the usable metal materials can be expanded.

As to the elongation characteristics of the elastic metal plate, the degree of elongation required at the time of fold-machining is low. Therefore, cracks and wrinkles do not occur so easily even when materials having inferior elongation characteristics are used. Accordingly, an expensive elastic metal plate having excellent elongation characteristics need not be used so as to prevent the occurrence of cracks and wrinkles, but economical elastic metal plate becomes usable. In this way, the limitation to the elongation characteristics of the elastic metal plate can be eased.

In the production method of the metal gasket according to the present invention, therefore, the limitations to the thickness, hardness and elongation characteristics of the elastic metal plate can be eased, cracks and wrinkles do not occur at the folded portions during the production, and the metal gasket can be obtained with high quality and economically.

DESCRIPTION OF THE PREFERRED EMBODIMENTS

Hereinafter, preferred embodiments of a metal gasket and production method thereof according to the present invention will be explained with reference to the accompanying drawings.

Figure 1:
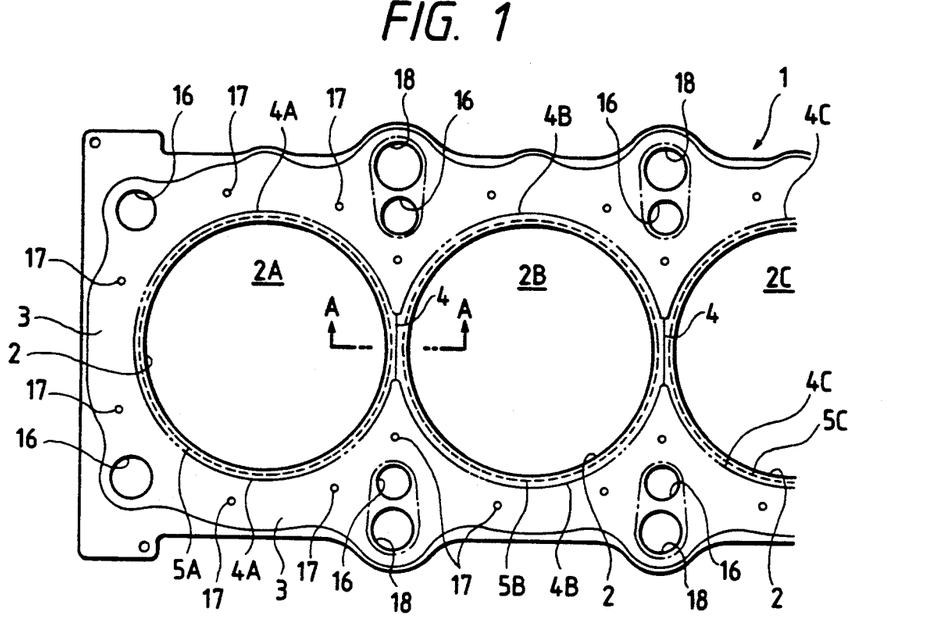
FIG. 1 is a partial plan view showing an embodiment of a metal gasket according to the present invention.

A metal gasket 1 shown in FIG. 1 is used for sealing opposed fitting surfaces between a cylinder head and a cylinder block in a multiple-cylinder engine such as a 6-cylinder engine. The metal gasket 1 consists of a single elastic metal plate or elastic metal plates, and the thickness t of the plate or plates is selected from the range of 0.10 to 0.30 mm in accordance with the structure of the metal gasket. It has been necessary conventionally to use a soft metal material having a hardness Hv of up to 200 before hardening in order to carry out fold-machining but according to the present invention, a material having a hardness Hv of up to 350 can be used for the elastic metal plate 3.

Holes for combustion chamber 2A, 2B, 2C (which will be hereinafter referred generically to as "holes" and will be represented by reference numeral 2) are formed in the elastic metal plate 3 of the metal gasket 1 corresponding in number to cylinders of the multi-cylinder engine. Oil holes for passing an oil, oil return holes 16, bolt holes 17 of bolts for fastening the metal gasket 1 between opposed fitting surfaces, water holes 18 of cooling water, knock holes, rivets holes etc., are bored in the elastic metal plate 3 of the metal gasket 1. The elastic metal plate 3 has a shape of a conical mountain of a conical valley surrounding each hole, around the hole in the section passing through the hole, though the section is not shown in the drawing, so that it seals the periphery of each hole when the metal gasket 1 is fastened.

A non-metallic material having heat resistance and oil resistance such as a fluoro rubber and resin is applied to both surfaces of the metal gasket 1 to a thickness of about 10 about 50 μ, though this coating is not shown in the drawing. Accordingly, it is possible to avoid metal-to-metal contact between the cylinder head and the cylinder block and to secure sufficient corrosion resistance, durability and strength as the metal gasket. Even if any concavo-convexities exist on the metal gasket 1 itself or on mechanical machining surfaces such as the opposed fitting surfaces between the cylinder head and the cylinder block, the non-metallic material described above can cover the concavo-convexities and can exhibit a sufficient seal function. Coating by the non-metallic material is preferably completed after the thickness adjustment of the elastic metal plate 3 having the holes formed thereon and before the start of fold-machining.

Figure 2:
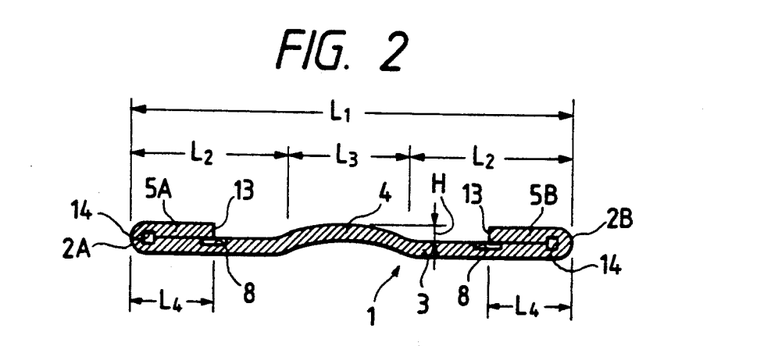
FIG. 2 is a sectional view taken along a line A—A of FIG. 1 showing the metal gasket.

FIG. 2 shows the section of the metal gasket 1 cut along a line A—A connecting the centers of the holes 2A and 2B at the boundary portion of the adjacent holes 2 formed in the elastic metal plate 1, that is, the section between the holes 2. This sectional structure holds also true of the boundary portions of other adjacent holes 2.

As can be understood from these drawings, the metal gasket 1 consists of a single, elastic metal plate 3. The thickness t of this elastic metal plate 3 is within the range of about 0.10 to about 0.3 mm, for example, about 0.25 mm. Beads 4A, 4B, 4C (all of which will be generically represented by reference numeral 4) having a mountain-shaped sectional shape, that is, having concavo-convexities, are so formed around the holes 2 as to encompass concentrically and annularly the proximity portions of these holes 2. The beads 4 merge with one another into one bead 4 in the regions between adjacent holes such as the holes 2A and 2B. The distance from each hole 2 becomes progressively smaller at the merging portion of the beads 4, and the width of the beads 4 becomes small as described above. However, if a sufficient distance can be secured between the holes 2, the beads 4 may be spaced apart by a small distance from one another without being overlapped with one another. In the embodiment shown in the drawings, the beads 4 start at the position of a distance $L_2$ (e.g. about 2.0 mm) from the inner periphery of the hole 2, a predetermined width $L_3$ as viewed in the radial direction is about 2 mm in the region between the holes 2 and is about 2.5 mm in regions other than the regions between the holes 2. The top on the convexity side of each bead 4 is formed substantially flatly with a width of 5 mm in the regions other than the regions between the holes 2. This arrangement stabilizes the contact between the beads 4 and the opposed fitting surfaces, though a spring constant is somewhat lowered. The height H of the beads, is about 0.25 mm which is the thickness of the elastic metal plate 3. The diameter of the holes 2 is 87 mm, and the distance $L_1$ between the adjacent holes 2 is about 6.0 mm, for example.

The elastic metal plate 3 has folded portions 5A, 5B, 5C (all of which will be hereinafter represented generically by reference numeral 5) around the peripheries of the holes 2. The folded portions 5 are formed on the convexity side of the beads 4 in such a manner as not to overlap with the beads on the inner side and in the radial direction of the beads,, 4 The width of the folded portions 5 of the elastic metal plate 3 in the radial direction, that is, the folded width $L_4$, is about 1.5 mm, for example.

Figure 3:
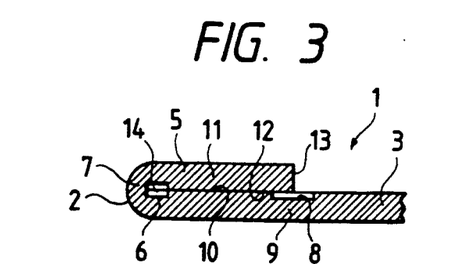
FIG. 3 is a partial enlarged sectional view of a folded portion as a part of FIG. 2.

As shown in FIG. 3 which is an enlarged view of the folded portion 5, a circumferential groove, that is, an annular groove 6, is formed in the region of the folded base portion 7 of the folded portion 11 and the thickness is reduced. In this way, an annular hollow portion, that is, a gap 14, is defined in the folded portion. The folded inner surface 12 of the folded portion 11 is in contact with a surface of the elastic metal plate main body, the thickness of which is not reduced, in the region outside the gap 14 in the radial direction of the hole 2. Furthermore, the portion 9 of the elastic metal plate main body facing the folded tip 13 of the folded portion 5 is made partially thin from the folded surface side in such a manner as to define a circumferential groove, that is, an annular groove 8. Accordingly, the folded tip 13 is not in contact with the surface of the elastic metal plate 3.

When the metal gasket 1 is interposed between the cylinder head and the cylinder block, fastened by bolts inserted through the bolt holes 17, for example, and brought, into the pressed state, the beads 4 of the elastic metal plate 3 and the folded portions 5 come into contact with the opposed fitting surfaces, and form double ring-like seal portions around the holes 2. These double ring-like seal portions prevent the leak of a high temperature high pressure combustion gas from the holes 2 to the opposed fitting surfaces. Even when any irregularity occurs on the opposed fitting surfaces between the cylinder head and the cylinder block at the time of fastening of the cylinder head and the cylinder block, the folded portions 5 and the beads 4 undergo deformation in response to such irregularity and absorb irregular gaps along with the increase of folded portions 5 bear and support the fastening force in cooperation with the beads 4 and prevents compression of the beads 4 by the sheet thickness of the folded portions 5, and thus prevent buckling of the beads 4. Deflection of the cylinder head occurring due to the repetition of the combustion cycles of explosion and expansion strokes of the engine is suppressed by the increase of the ring-like seal portions and the absorption of irregularity of the opposed fitting surfaces, and the occurrence of cracks of the seal portions can be prevented. Such functions of the metal gasket 1 are not different from those of the conventional metal gasket.

When such a metal gasket 1 is interposed and clamped between the opposed fitting surfaces of the engine, the annular region of the folded portion 5 consisting of the surface 10 coming into contact with the elastic metal plate 3, that is, the elastic metal plate main body, shares and supports the fastening force. The folded portion 5 is not pressed to the elastic metal plate main body 3 at the folded base portion 7 having the gap 14 and at the folded tree end 13 and even when it comes into contact with the main body, its press force is sufficiently small. Accordingly, the gap 14 of the folded edge 7 is not absorbed by the fastening work of the metal gasket 1 but is secured even when fastening is completed. Therefore, the folded base 7 is not crushed, and stress concentration does not occur, either. Consequently, cracks and distortion do not occur in the folded base 7 with the fastening work of the metal gasket 1. Though load fluctuation acts on the folded base 7 with the operation of the engine, stress fluctuation acting on the folded base 7 is eased and cracks, distortion, breakage, etc., do not occur in the folded base 7 in the course of use for a long time. Furthermore, since the folded free end 13 can use the circumferential groove 8 as the recess and is out of contact from the elastic metal plate main body, the folded free end 13 does not cause any indentations and cracks by its edge on the surface of the elastic metal plate main body.

The folded, portion 5 serves as an offset to the elastic metal plate main body, but the surface of the elastic metal plate 3 at which the folded free end 13 is positioned has the annular groove 8 due to the reduction of the thickness. Deformation which eliminates such an offset is applied to the elastic metal plate 3 when the metal gasket 1 is clamped between the opposed fitting surfaces, but the elastic metal plate 3 is bendable from the starting position of the thin portion 9 of the annular region positioned inward in the radial direction from the folded free end 13. Therefore, the bending stress occurring in the elastic metal plate main body is reduced at this offset portion.

Figure 4:
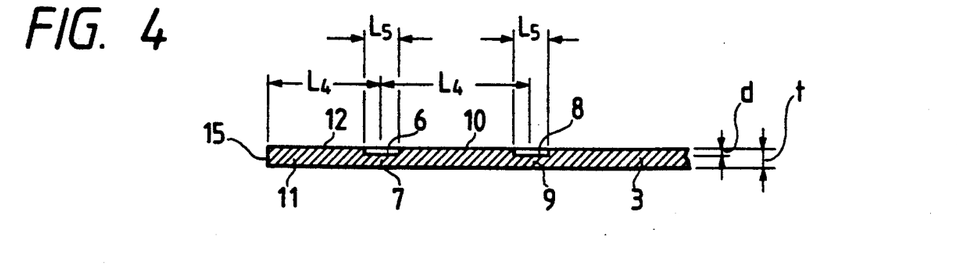
FIG. 4 is a partial exploded view of a elastic metal plate forming the folded portion shown in FIG. 3.

The metal gasket 1 has the construction as described above, and can be produced by the production method involving the following steps. This production method will be explained with reference to an exploded view of FIG. 4 showing the elastic metal plate 3 before folding.

First of all, perforations 15 having a radius smaller by a predetermined length than that of desired holes 2 are bored in the elastic metal plate 3. Each perforation 15 is a hole which will become the folded free end 13 at the time of completion of folding. Here, the center of the hole 2 is in conformity with that of the perforation 15. Various holes other than the holes 2 such as the bolt holes 17 are bored. Next, the annular grooves 6 and 8 are formed by shaping into a reduced thickness the annular region 7 having a predetermined width $L_5$ (0.6 mm in the embodiment shown in the drawing) with the portion spaced by a folded width $L_4$ outward from the periphery of the perforation 15 in the radial direction as the center, and the annular region 9 having a predetermined width $L_6$ (0.6 mm in the embodiment shown in the drawing) with the portion (spaced by a distance double the folded width $L_4$ from the perforation 15), at which the folded free end 13 is positioned, as the center, respectively. The reduction of the thickness of the elastic metal plate 3 is carried out from the surface of the elastic metal plate 3 on its folded side. A region the thickness of which is not reduced is formed between the thin portion 7 of the annular region and the thin portion 9 of the annular region with a predetermined gap (0.5 mm in the embodiment shown in the drawing) between them. The depth d of the thin portion is 0.02 mm in the embodiment shown in the drawing.

The reduction of thickness for forming the annular grooves 6, 8 in the elastic metal plate 3 may be made by any of machining methods inclusive of press shaping, etching, cutting, and so forth. When press shaping is employed, press shaping can be carried out simultaneously with punch-out of the perforation 15. Next, the beads 4 are formed on the elastic metal plate 3 along the holes 2, and the folded portion 11 having the folded width $L_4$ up to the center line of the annular groove 6 is bent outward in the radial direction on the side of the surface on which thickness reduction is made, around the perforation 15, so that the surface 12 of the folded portion 11 is brought into contact with the surface 10. The folded free end 13 is brought to the center position of the annular groove 8, that is, the annular region the thickness of which is reduced. After this fold-machining step is completed, the folded portion 5 using the inner periphery of the folded base 7 thus folded as the hole 2 is formed. Finally, the elastic metal plate 3 having the folded portion 5 thus formed thereon is heat-treated and hardened, and the metal gasket 1 having suitable flexibility can be produced.

After the fold-machining step for shaping the folded portion 5 but before the metal gasket 1 is heat-treated, a step of delicate deformation to a predetermined thickness can be carried out by applying a compressive force to the folded portion 5 in the direction of its thickness. In other words, the cylinder head has lower rigidity than the cylinder block, and the portions between the adjacent holes 2 in the multiple-cylinder engine is the portions at which the greatest distortion is likely to occur due to the load fluctuation in the combustion cycles of explosion and expansion strokes of the engine. Accordingly, these portions are also the portions at which the seal function by the metal gasket 1 is most likely to drop. Therefore, in order to make the seal performance in the regions between the holes 2 of the folded portion 5 higher than the seal performance in the regions other than the regions between the holes 2, the thickness of the folded portion 5 positioned in the regions between the holes 2 may be made greater than the thickness of the folded portion 5 positioned in the regions other than the regions between the holes 2. Therefore, it is possible to provide a step of applying a compressive force for deforming the folded portion 5 positioned in the regions other than the regions between the holes 2 much more greatly than the folded portion 5 positioned between the holes 2, after the fold-machining step of folding the folded portion 5.

Figure 10:
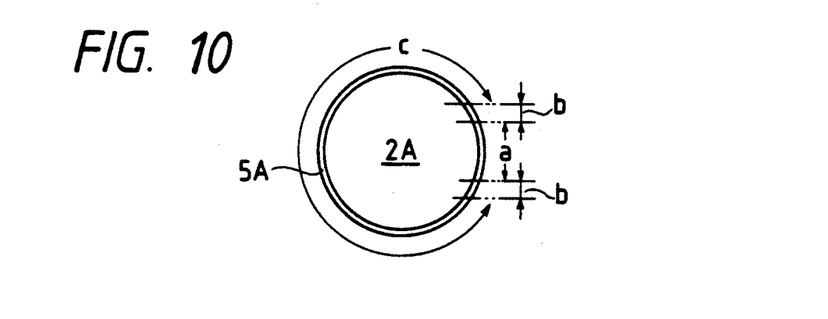
FIG. 10 is an explanatory view showing the distribution of the thickness of the folded portion around holes positioned at both ends of the metal gasket.
Figure 11:
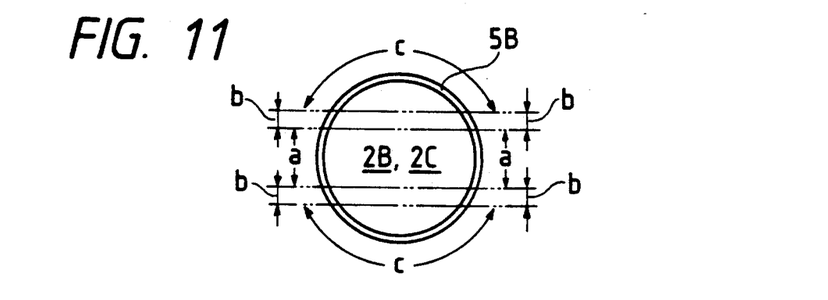
FIG. 11 is an explanatory view showing the distribution of the thickness of the folded portion around holes positioned at positions other than both ends of the metal gasket.

More definitely, as shown in FIGS. 10 and 11, the thickness is made the greatest in the region a between the holes 2 of the elastic metal plate 3, progressively decreases in the regions b extending on both sides of the region a and becomes the smallest in the region c extending on both sides of the regions b. After the folded portion 5 is formed, the elastic metal plate 3 is heat-treated and hardened. At this time, hardening is so made that the hardness is below Hv 350 before the formation of the beads and becomes a hardness in accordance with the kind of the elastic metal plate 3 (e.g. Hv 500) after the heat-treatment.

Figure 5:
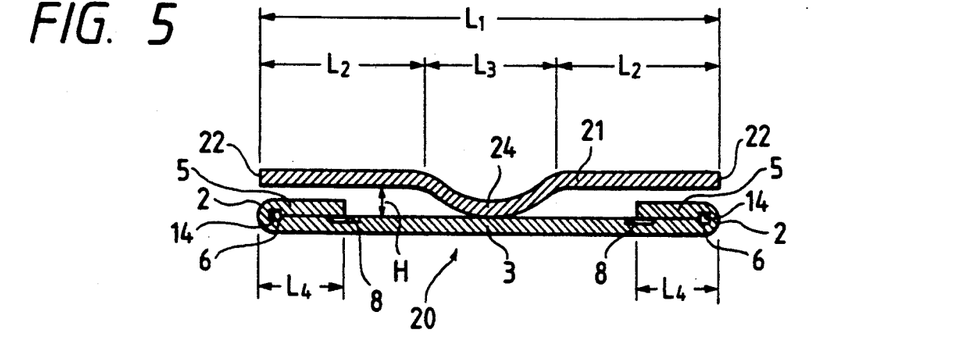
FIG. 5 is a partial sectional view showing portions between holes of another embodiment of the metal gasket according to the present invention.

The metal gasket shown in FIG. 5 consists of two elastic metal plates. This metal gasket 20 comprises a elastic metal plate 3 having, the folded portion 5 formed thereon and a elastic metal plate 21 having a thickness greater than that of the elastic metal plate 3 and having the beads 24 formed thereon. In other words, another elastic metal plate 21 is laminated on the elastic metal plate 3, the beads 24 are formed on the elastic metal plate 21 along the holes 22, and the convexities of the beads 24 are so positioned as to face the folded portion 5 of the elastic metal plate 3. The thickness of the elastic metal plate 3 is about 0.12 mm. The position of each hole 22 of the elastic metal plate 21 is in complete conformity with the hole 2 of the elastic metal plate 3. The folded portion 5 is not functionally different from that of the foregoing embodiment.

Therefore, the repetition of the explanation will be omitted. The folded portion 5 of the elastic metal plate 3 is folded and formed towards the beads 24 of the elastic metal plate 21. When the metal gasket 20 is fastened, this folded portion 5 shares and supports the fastening force in cooperation with the beads 24, and prevents complete compression of the beads and their buckling.

Figure 6:
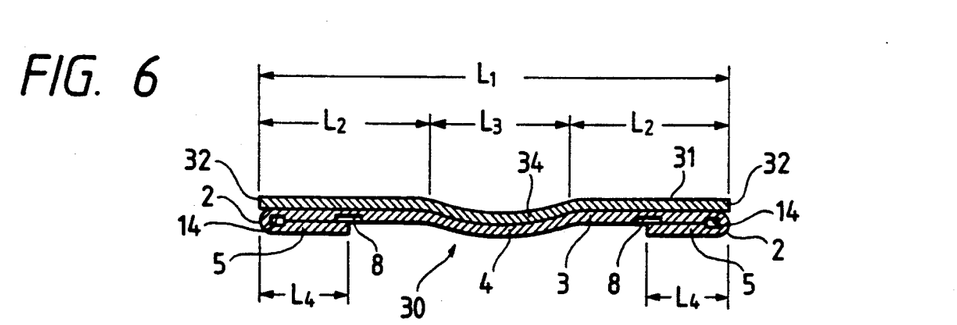
FIG. 6 is a partial sectional view showing portions between holes of still another embodiment of a metal gasket according to the present invention.

The metal gasket shown in FIG. 6 comprises the elastic metal plate 3 having the folded portion 5 formed thereon and the elastic metal plate 31 having the bead 34 formed thereon and having a greater thickness than that of the elastic metal plate 3. Another elastic metal plate 31 is laminated on this elastic metal plate 3, the head 34 is formed along the hole 32 and the convexity of this bead 34 fits into the recess of the bead 4 of the elastic metal plate 3 under the alignment state. The elastic metal plate 31 has the same structure as that of the elastic metal plate 21 shown in FIG. 5. The elastic metal plate 3 forming the folded portion 5 has the same thickness as that of the elastic metal plate 3 shown in FIG. 5, and the bead 4 is so formed, as to match with the bead shape of the elastic metal plate 31. Accordingly, when both elastic metal plate 3, 31 are superposed, they are in a matching state without any gap between them. The folding direction of the folded portion 5 exists on the convexity side of the bead 4, and the basic functions such as bearing and supporting of the fastening force of the metal gasket 30, the prevention of full compression and buckling of the bead, absorption of irregularity of the opposed fitting surfaces, the prevention of cracks due to the load fluctuation during the engine operation, and so forth, are the same as those described already.

Figure 7:
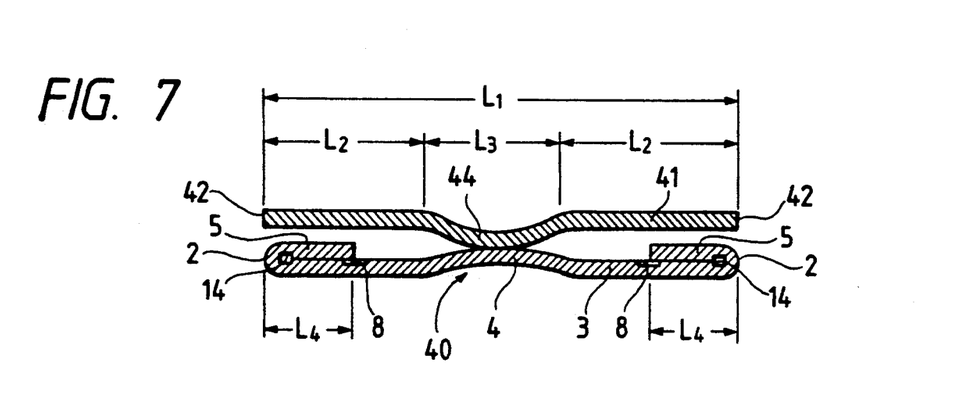
FIG. 7 is a partial sectional view showing portions between holes of still another embodiment of the metal gasket according to still another embodiment of the present invention.

The metal gasket 40 shown in FIG. 7 consists of two elastic metal plates, i.e. the elastic metal plate 3 having the folded portion 5 formed thereon and the elastic metal plate 41 having a thickness greater than that of the elastic metal plate 3 and, having the bead 44 formed thereon. The elastic metal plate 41 has a structure equipped with the bead 44 formed along the hole 42, in the same way as the elastic metal plate 21 shown in FIG. 5 and the elastic metal plate 31 shown in FIG. 6. The thickness of the elastic metal plate 3 forming the folded portion 5 is approximately equal to that of the elastic metal plate 3 shown in FIG. 5, that is, about the half of the thickness of the elastic metal plate 41, and a bead 4 which is convexed towards the bead 44 is formed at a position opposing the bead 44. The bead width of the bead 4 is greater than that of the bead 44, but the top of the bead 4 is shaped flatly so as to absorb any position deviation from the bead 44 and to stabilize the contact between the convexities of the beads 4 and 44. The structure of the folded portion 5 is the same as that of FIG. 3. When the metal gasket 40 is fastened between the opposed fitting surfaces, it comes into strong sealing contact with the opposed fitting surfaces in the skirt regions of the beads 4, 44 and the region of the folded portion 5. However, the elastic metal plate 3 having a smaller thickness first reaches its yielding point by a small force and then the thick elastic metal plate 41 starts deflection and exhibits desirable spring characteristics in accordance with the fastening step. The folded portion 5 is folded towards the convexity side of the bead 4, and the basic functions such as sharing and supporting of the fastening force of the metal gasket 40, the prevention of full compression and buckling of the beads 4, 44, absorption of any irregularity of the opposed fitting surfaces, the prevention of cracks due to the load fluctuation during the engine operation, and so forth, are the same as those described already.

Figure 8:
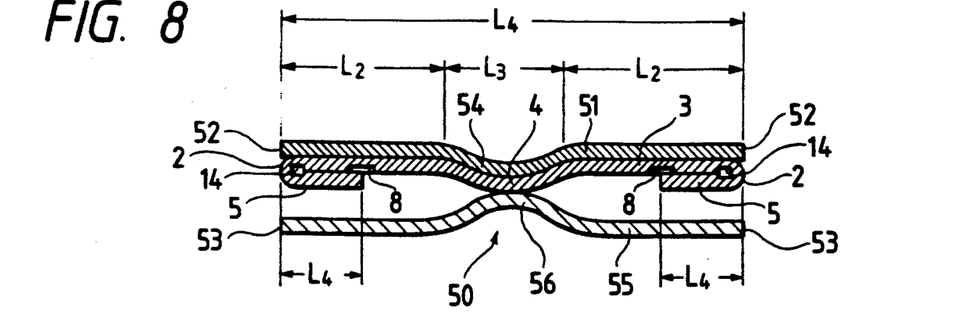
FIG. 8 is a partial sectional view showing portions between holes of still another embodiment of the metal gasket according to the present invention.

The metal gasket 50 shown in FIG. 8 consists of three elastic metal plates. This metal gasket 50 corresponds to the metal, gasket which is obtained by laminating another elastic metal plate on the metal gasket 30 shown in FIG. 6 in such a manner that their bead portions oppose one another. The external elastic plates 51, 55 have the beads 54, 56, respectively. The beads 54 and 56 are disposed on the sides so that their convexities oppose each other. The elastic metal plate 3 forming the folded portion 5 is sandwiched between both, elastic metal plates 51 and 55, and is laminated on the elastic metal plate 51 without a gap and with their bead shapes being in conformity with each other in the same way as in the metal gasket 30 shown in FIG. 6. The holes 52, 52 and 53, 53 of the elastic metal plates 51, 55 are in conformity with the holes 2, 2 of the elastic metal plate 3. Besides the strong seal function by the two thick external elastic metal plates 51, 55, the basic functions such as sharing and supporting of the fastening force of the metal gasket 50, the prevention of full compression and buckling of the beads, absorption of irregularity of the opposed fitting surfaces, the prevention of cracks due to the load fluctuation during the engine operation, and so forth, are the same as those of the foregoing embodiments.

Figure 9:
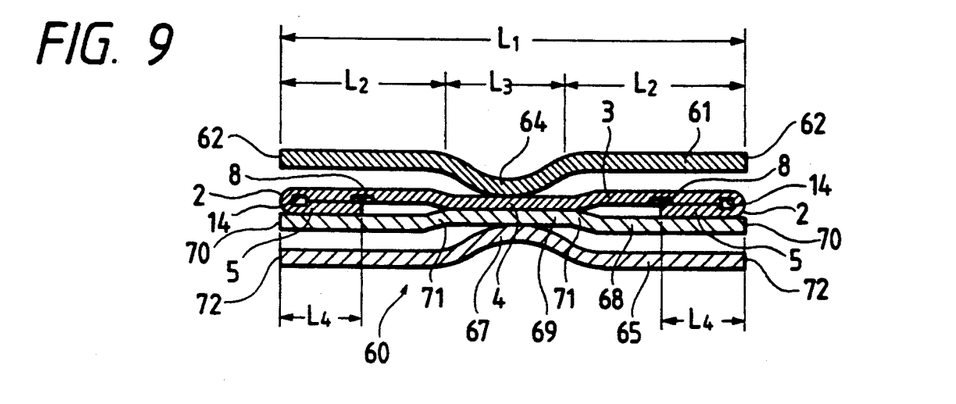
FIG. 9 is a partial sectional view showing portions between holes of still another embodiment of the present invention.

The metal gasket 60 shown in FIG. 9 consists of three elastic metal plates. The metal gasket 60 has the structure of a laminate type wherein an intermediate plate consisting of two elastic metal plates 3, 68, the tops of the beads 4, 69 of which come into symmetric contact with each other, is sandwiched between two elastic metal plates 61, 65 having the beads 64, 67 so formed thereon as to extend along juxtaposed holes 62, 72. An offset portion 71 having a height less than the thickness of the elastic metal plate 3 as a second intermediate plate is formed along the hole 70 of the elastic metal plate 68 as a first intermediate plate, and the elastic metal plate 3 is laminated on the outer surface which becomes a convex surface due to the formation of the offset portion 71. The folded portion 5 of the elastic metal plate 3 is folded towards the offset portion 71 formed on the first intermediate plate, and forms a compensation portion having a thickness greater than the sum of the thickness of the two intermediate plates at the portions at which the tops of the beads 4 and 69 come into mutual contact, around the holes 2, 70. This compensation portion improves the face-to-face pressure at the time of fastening of the metal gasket between the opposed fitting surfaces, reduces the stress fluctuation of the bead substrate and the bending stress applied thereto, prevents the breakage of the bead portions and compensation portion and the drop of the seal effect, and exhibits a stable seal effect under a severe condition for the metal gasket such as in a Diesel engine.

What is claimed is:

1. In a metal gasket having an elastic metal plate made of a metal material having elasticity and provided with holes for combustion chambers and folded portions each formed by turning the end of said elastic metal plate back against itself to form said hole; the improvement characterized in that:
    first annular grooves are so defined in an inner surface side of said folded portions of said elastic metal plate as to extend along said holes, said elastic metal plate is folded in such a manner as to define annular hollow portions on the inner surface side of said folded portions by said first annular grooves, and second annular grooves are defined in the surface of said elastic metal plate at portions at which folded free ends of said folded portions are positioned.

2. A metal gasket according to claim 1, wherein beads are so formed on said elastic metal plate as to extend along said holes for combustion chambers as seal portions having a surface on the side of said folded portions shaped into a convexity and the other surface shaped into a concavity.

3. A metal gasket according to claim 2, wherein said folded portions are folded on said convexity side of said beads.

4. A metal gasket according o claim 2, wherein a second elastic metal plate is laminated on said elastic metal plate on the side of said convexity of said beads formed on the side of said folded portions, second beads as seal portions having one surface shaped into a convexity and the other surface shaped into a concavity are formed on said second elastic metal plate, and said convexities of said elastic metal plate and said convexities of said second elastic metal plate are in mutual contact while facing one another.

5. A metal gasket according to claim 4, wherein a third elastic metal plate is interposed between said elastic metal plate and said second elastic metal plate.

6. A metal gasket according to claim 2, wherein said second elastic metal plate having second holes corresponding to said holes is laminated on said elastic metal plate, second beads are so formed as to extend along said second holes of said second elastic metal plate, said convexities of said second beads and said folded portions of said elastic metal plate are in mutual contact on the opposed side.

7. A metal gasket according to claim 2, wherein said second elastic plate having second holes corresponding to said holes is laminated on said elastic metal plate, said second beads ar so formed on said second elastic metal plate as to extend along said second holes, and convexities of said second beads fitted into said concavities of said beads of said elastic metal plates in a matching state.

8. In a production method of a metal gasket by producing an elastic metal plate from a metal material having elasticity, forming perforations having a small diameter in said elastic metal plate, and folding said elastic metal plate outward in a radial direction from the periphery of said perforations to form folded portions so as to define holes;
    the improvement characterized by including: a step of machining first annular grooves and second annular grooves in said elastic metal plate,
    said first annular grooves each being provided at a region at where an end of said elastic metal plate is to be folded back against itself to form said hole,
    said second annular grooves each being provided at a region at where the end of said folded portion is located; and
    a step of folding the end of said elastic metal plate back against itself at said first annular grooves to form said holes.

9. A production method of a metal gasket according to claim 8, which includes a step of forming beads having convexities on the side of folded portions along said holes for combustion chamber of said elastic metal.

10. A production method of a metal gasket according to claim 8, which includes a step of laminating second elastic metal plate on said elastic metal plate, said second elastic metal plate having second holes corresponding to said holes and having second beads which extend around said second holes.

* * * * *